United States Patent Office 3,121,740
Patented Feb. 18, 1964

3,121,740
4-(HYDROXY- AND ALKOXY-)-7-INDANOYL-ALKANOIC ACIDS
Royal A. Cutler, Sand Lake, N.Y., and Johannes S. Buck, deceased, late of Albany, N.Y., by Phillis G. Buck, executrix, Ridgewood, N.J., assignors to Sterling Drug Inc., New York, N.Y., a corporation of Delaware
No Drawing. Filed June 30, 1961, Ser. No. 121,257
4 Claims. (Cl. 260—520)

This invention relates to indanyl-oxo-aliphatic carboxylic acid compounds and to methods for their preparation. More particularly, the invention relates to novel omega-(substituted-ar-indan)-omega-oxo-aliphatic carboxylic acid compounds.

It is known that certain synthetic organic compounds, structurally unrelated to the bile acids, have the property of increasing the output of bile by the liver. Such compounds, termed choleretics in the art, find utility in the treatment of a variety of pathological conditions of the gall bladder and the bile ducts, for example, cholecystitis and cholangitis.

It is a principal object of this invention to provide new and useful choleretic agents.

The novel compounds of this invention are omega-(4-substituted - 7-indan)-omega-oxo-saturated-aliphatic carboxylic acid compounds having, in the free acid form, the general formula

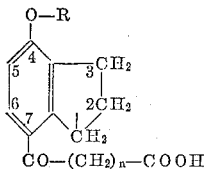

wherein R is a member of the group consisting of hydrogen and lower-alkyl having from one to six carbon atoms and $n$ is an integer from two to four, and the salt forms of the free acids.

When R in the above formula is lower-alkyl, it includes the branched and unbranched alkyl radicals of low molecular weight, for instance those containing from one to six carbon atoms, for example methyl, ethyl, n-propyl, isopropyl, n-butyl, isobutyl, tert-butyl, n-pentyl, n-hexyl, and the like.

The free acid forms of the compounds react with organic and inorganic bases to produce organic and inorganic salt forms. The preferred salts are those which are water-soluble and which have pharmacologically-acceptable cations. However, all the salt forms, including those which are insoluble and those having cations which are not physiologically acceptable are useful in purification procedures, as means for identification of the corresponding acids, and as sources of the corresponding free acids and hence also of the preferred, pharmacologically-acceptable salts. Representative examples of the salts are those wherein the acidic hydrogen in the acid of the formula hereinabove is replaced by one equivalent of a cation of an alkali metal, for example, sodium, potassium, and lithium, an alkaline earth, for example, magnesium, calcium, strontium, and barium, and other metal ions for example, zinc, iron, copper, nickel, manganese, lead, cobalt, and the like. Non-metallic cations include for example, the ammonium ion (NH$_4$) and substituted, organic ammonium ions derived from primary, secondary, and tertiary amines, and quaternary ammonium ions.

The compounds of the invention can be prepared by the reaction of 4-alkoxyindans and 4-hydroxyindan with approximately an equimolar quantity of the appropriate dibasic saturated aliphatic carboxylic anhydride in the presence of a Friedel-Crafts catalyst, the preferred catalyst being anhydrous aluminum chloride, and in the presence of an inert reaction medium. Suitable solvents for the reaction include, for example, nitrobenzene, carbon disulfide, carbon tetrachloride, chlorobenzene, benzene, and tetrachlorethane.

It will be understood that the process employed in this invention involves a novel application of the conventional Friedel-Crafts synthesis. The procedural conditions required in the Friedel-Crafts reaction are well-known in the art. Thus, generally speaking, it is preferred to carry out the reaction at the lowest possible temperature which will afford a reasonably rapid rate of reaction, and thereby minimize or avoid undesirable side reactions.

When 4-hydroxyindan is used as a reactant, the preferred temperature range is 100–150° C. An when a 4-alkoxyindan is used as a starting material, the reaction can usually be run at or below room temperature, for example, 0–30° C.

Although 4-hydroxyindan can be used as a starting material to prepare omega-(4-hydroxy-7-indanyl)-omega-oxo-aliphatic carboxylic acids, it is preferable to prepare the latter compounds from their corresponding 4-alkoxy derivatives by a dealkylation reaction. This dealkylation is catalyzed by both acids and bases and by certain salts. In the method of the instant invention, it has been found preferable to heat a solution of the omega-(4-alkoxy-7-indanyl)-omega-oxo-aliphatic carboxylic acid in a suitable inert solvent, for example, chlorobenzene, in the presence of aluminum chloride. Alternative procedures involve heating the above phenolic ethers with an alkali metal hydroxide, for example, potassium hydroxide, in a high boiling solvent, for example ethylene glycol, and heating the phenolic ethers in the presence of a mineral acid, for example, hydriodic acid.

The molecular structures of the novel compounds herein disclosed are established by their mode of synthesis and corroborated by the correspondence of calculated and found values for the elementary analyses for representative examples.

The compounds of the instant invention possess valuable pharmacodynamic properties, in particular, choleretic activity. For example when administered intravenously to dogs at doses of 20 mg./kg. of body weight, 4-(4-methoxy-7-indanyl)-4-oxobutanoic acid (Example 1 below) increased the flow of bile by more than eight and one-half times the control volume thirty minutes after injection.

Since applicants have found that 4-(5-methoxy-6-indanyl)-4-oxobutyric acid, a position isomer of 3-(4-methoxy-7-indanyl)-4-oxobutanoic acid has no significant choleretic activity, the exceptional choleretic activity of applicants' compounds is very surprising. This unexpected result, that is, the remarkable increase in choleretic activity by a mere shift in the position of substituents on the indan nucleus, is an important feature of the invention.

The following examples of the invention are given for the purpose of illustration only, and are not to be construed as limiting the invention in either scope or spirit. It will be obvious to those skilled in the art that various modifications of both reactants and reaction conditions can be employed to produce essentially the same results, and such modifications are considered the full equivalents of the illustrated reactants and reaction conditions given herein.

EXAMPLE 1

Anhydrous aluminum chloride (232 g.; 1.74 mols) was added slowly and with stirring to 725 ml. of cold nitrobenzene. After the red solution had been cooled to 0–5°, 87 g. (0.87 mol) of succinic anhydride was added slowly. 4-methoxyindan (129 g.; 0.87 mol) was then added, and the resulting solution was stirred for four hours, maintaining the temperature below 5°. The solution was then poured into about four liters of ice and water containing about 100 ml. of concentrated hydrochloric acid. The solid which separated was washed with water and ether. The crude 4-(4-methoxy-7-indanyl)-4-oxobutyric acid was purified by dissolving it in dilute sodium bicarbonate solution, treating the solution of sodium 4-(4-methoxy-7-indanyl)-4-oxobutanoate thus obtained with activated charcoal, reprecipitating the acid with hydrochloric acid, and repeatedly recrystallizing the product from 95 percent ethanol. The pure 4-(4-methoxy-7-indanyl)-4-oxobutanoic acid thus obtained melted at 200.5–203.1° C. (corr.).

*Analysis.*—Calcd. for $C_{14}H_{16}O_4$: C, 67.72; H, 6.50. Found: C, 67.83; H, 6.69. Neutralization equivalent calcd.: 248.3. Found: 248.

EXAMPLE 2

To a solution containing 7 g. (0.028 mol) of 4-(4-methoxy-7-indanyl)-4-oxobutanoic acid in 50 ml. of chlorobenzene there was added 15 g. of anhydrous aluminum chloride. The mixture was warmed at about 60° for about 1.25 hours and was then poured into ice containing an excess of concentrated hydrochloric acid. The crude product was dissolved in dilute sodium bicarbonate solution, and the solution of sodium 4-(4-hydroxy-7-indanyl)-4-oxobutanoate thus obtained was treated with activated charcoal. Acidification of the alkaline solution precipitated the free acid which was further purified by recrystallization from 95 percent ethanol. The melting point of 4-(4-hydroxy-7-indanyl)-4-oxobutanoic acid thus produced was 228–231° C.

Further examples of the invention are prepared by the methods shown in Examples 1 and 2. In Tables I and II which follow, the starting materials used and the products isolated in each case are indicated. Examples in Table I are prepared by the method of Example 1 above, and examples in Table II are prepared by the method of Example 2 above.

Table I

| Ex. No. | Starting Materials | | Product |
|---|---|---|---|
| | Indan | Anhydride | |
| 3 | 4-Methoxyindan | Glutaric | 5-(4-Methoxy-7-indanyl)-5-oxopentanoic acid. |
| 4 | 4-Ethoxyindan | Succinic | 4-(4-Ethoxy-7-indanyl)-4-oxobutanoic acid. |
| 5 | 4-Methoxyindan | Adipic | 6-(4-Methoxy-7-indanyl)-6-oxohexanoic acid. |
| 6 | 4-n-Butoxyindan | Succinic | 4-(4-Butoxy-7-indanyl)-4-oxobutanoic acid. |
| 7 | 4-tert.-Butoxyindan | do | 4-(4-tert.-Butoxy-7-indanyl)-4-oxobutanoic acid. |
| 8 | 4-n-Pentoxyindan | Adipic | 6-(4-n-Pentoxy-7-indanyl)-6-oxohexanoic acid. |
| 9 | 4-n-Hexoxyindan | Glutaric | 5-(4-n-Hexoxy-7-indanyl)-5-oxopentanoic acid. |

Table II

| Ex. No. | Starting Material | Product |
|---|---|---|
| 10 | 5-(4-Methoxy-7-indanyl)-5-oxopentanoic acid. | 5-(4-Hydroxy-7-indanyl)-5-oxopentanoic acid. |
| 11 | 6-(4-Methoxy-7-indanyl)-6-oxohexanoic acid. | 6-(4-Hydroxy-7-indanyl)-6-oxohexanoic acid. |

Examples 10 and 11 can also be prepared according to the procedure of Example 1 by acylating 4-hydroxyindan with glutaric anhydride and with adipic anhydride respectively.

What is claimed is:

1. Omega-[4-(R-O)-7-indanyl] - omega - oxo - alkanoic acid having from four to six carbon atoms in the alkanoic acid chain, where R is a member of the group consisting of hydrogen and lower-alkyl.

2. Omega - (4 - lower - alkoxy - 7 - indanyl) - omega-oxo-alkanoic acid having from four to six carbon atoms in the alkanoic acid chain.

3. 4-(4-methoxy-7-indanyl)-4-oxobutanoic acid.

4. 4-(4-hydroxy-7-indanyl)-4-oxobutanoic acid.

References Cited in the file of this patent

Wagner et al.: "Synthetic Organic Chemistry," pp. 171 and 322 (1953).

Dev: Chemical Abstracts 49, p. 3116 (1955).